April 19, 1960     F. H. MUSTIN ET AL     2,933,378
SOLID FUEL UNIT

Filed Nov. 25, 1957     3 Sheets-Sheet 1

INVENTORS
FRANK H. MUSTIN
PAUL A. MULCEY
BY Robert M. Ball
ATTORNEY

April 19, 1960 F. H. MUSTIN ET AL 2,933,378
SOLID FUEL UNIT
Filed Nov. 25, 1957 3 Sheets-Sheet 2

INVENTORS
FRANK H. MUSTIN
PAUL A. MULCEY
BY
Robert M. Barr
ATTORNEY

INVENTORS
FRANK H. MUSTIN
PAUL A. MULCEY
BY Robert M. Barr
ATTORNEY

United States Patent Office 2,933,378
Patented Apr. 19, 1960

2,933,378
SOLID FUEL UNIT

Frank H. Mustin, Lansdowne, and Paul A. Mulcey, Dallas, Pa., assignors to Frank H. Fleer Corporation, Philadelphia, Pa., a corporation of Delaware Application November 25, 1957, Serial No. 698,869

6 Claims. (Cl. 44—14)

The present invention relates to fuel burning and igniting instrumentalities and more particularly to a novel solid fuel unit. This application is a continuation-in-part of application Serial No. 627,805, filed December 12, 1956, and now abandoned.

During the past few years there has developed a widespread interest in home cooking apparatus which has been largely inspired by the demand for outdoor fireplaces in which meals can be prepared and served quickly for party consumption. The fuel problem for such cooking has caused much loss of interest in users because of the handling of dirty charcoal and the like; slow starting of an efficient burning area; difficulty of maintaining a uniform combustion; disagreeable odors; uncontrolled smoke; and accumulation of ashes.

It is an object of the invention a fuel unit which will overcome the foregoing disadvantages.

Another object of the invention is to provide a fuel unit which can be readily ignited, will initially emit a maximum heat in an inappreciable time after ignition and will continue to do so for enough time to complete a meal.

Another object is to provide a fuel unit wherein there is an effective distribution of heating surface in relation to the oxygen available for combustion.

A further object is to provide an efficient fuel unit which is so enclosed and protected that it is suitable for commercial transportation without breakage or absorption of moisture and can be handled by the ultimate user without hand soilage.

A further object of the invention is to provide a fuel unit of sheet-formation having a substantially flat surface producing, when the unit is ignited, a planar hot bed of fuel effectively spaced but relatively parallel to the superposed cooking, all of which is a radical departure from the use of individual briquets commonly thrown in bulk upon a grate and haphazardly spread in random arrangement in hit or miss spacing from the grill where uniform heat should be available.

Other objects are to provide a plate-like combustible unit for fireplaces wherein preformed sheets of combustible moldable material with complemental pockets are assembled back-to-back, with the pockets of one sheet having filling openings respectively for a measured charcoal composition including a binder, such composition being extruded by way of the openings to fill each pair of superposed pockets with the composition which in its initial condition has the required fluidity. Furthermore, the sheet material is relatively thick and tough to resist the required filling pressure while it also establishes a predetermined ratio of burning time to material.

A further object is to provide adhesive means between the superposed sheets as a result of the fuel extrusion.

Also it is an object to provide an assembly of matched inter-connected sheets and charcoal so shaped and arranged as to provide highly effective chimney effects giving quick and uniform spreading of ignited portions.

In accordance with the invention and general complemental arrangement nesting of one unit with another solves a problem of packaging and transportation.

In fulfillment of the foregoing objectives, the present invention provides a new and unique composite fuel unit of rigid construction and flat configuration which includes an ignitable combustible cover of complementary coacting contoured cover sections of fibrous material and a combustible charcoal composition entirely filling and adhesively bonded to and integrated with the cover sections. The configuration of the external surfaces of the unit creates an aerified design which insures adequate ventilation of the top and bottom surfaces thereof with a large surface area per unit of volume to provide and maintain a high rate of combustion of the unit. The nature of the filling material and the thickness of the cover sections insures prompt initial ignition of the fuel unit and continuation of combustion thereof for sufficient time to uniformly ignite the entire charcoal filler. The fiber cover sections additionally serve to prevent damage of the unit, dusting of the charcoal filler, and absorption of moisture both in transit and storage as well as in use of the unit. While the use of two cover sections as described is preferred, in one form of the invention, as shown and described herein, a single cover section only is employed.

Figure 1:
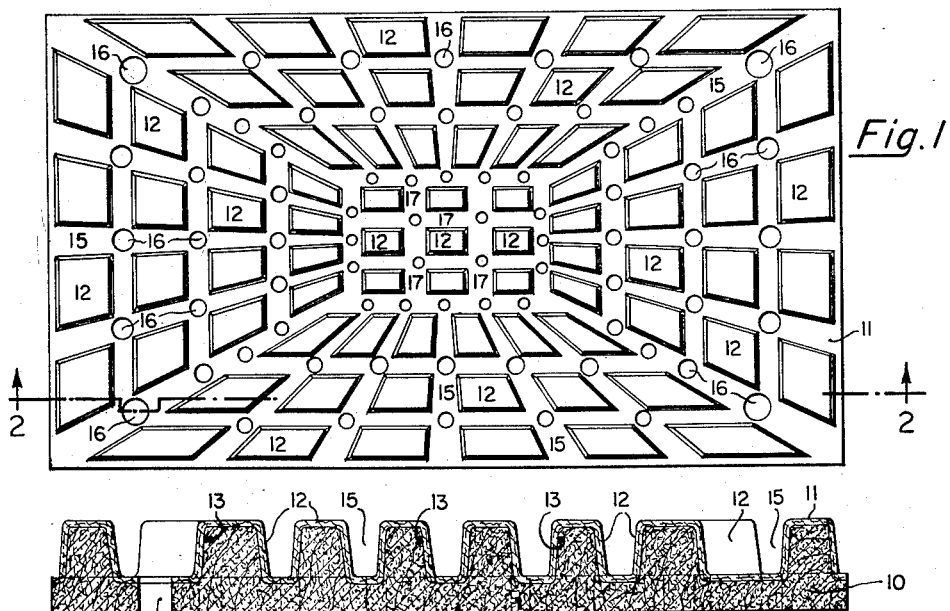
Fig. 1 is a face view of a fuel unit embodying one form of the invention.
Figure 2:
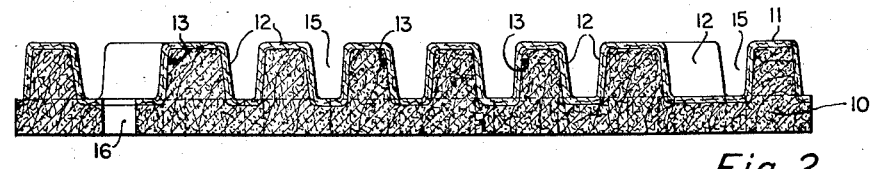
Fig. 2 is a section on line 2—2 of Fig. 1.

Referring to the drawings, the fuel unit of the invention as broadly considered comprises a planar body formed by at least two (but preferably three) superposed interlocked layer members 10 and 11, the former being a solid relatively thick mat of carbonaceous fuel, and the latter a face covering of moldable combustible material, such as paper mache or other fibrous material. The cover member 11 is preformed to form on one face an array of pockets or hollow protuberances 12, which thus result respectively in pockets 13 in the opposite face to be filled respectively with material extruded thereinto to form the fuel mat 10. This fuel mat 10 is preferably charcoal, fine coal or wood flour properly proportioned with water or a binder to a consistency for molding complemental to the covering configuration for setting into interlocked relation as a unitary assembly. The contact surfaces of the two members adhere during the pressing together or may have a binding adhesive applied.

The array of protuberances 12 is in a predetermined pattern to not only give rapid ignition but also ensure uniform burning over the entire area of the covering 11. To that end the protuberances 12 are arranged in spaced relation to form a plurality of air passages 15 leading from the margin of the covering 11 towards the central area thereof, such passages 15 being in communication with vertical draft holes 16 through the assembly. Preferably this center area is in the form of a square having the protuberances in substantially symmetrical spaced row formation providing passages 17 intersecting at right angles to distribute incoming air from the passages 15.

Figure 3:
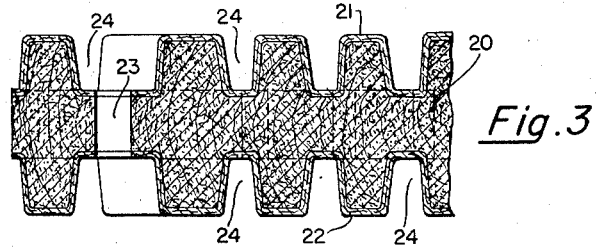
Fig. 3 is a like section of a unit embodying another form of the invention.
Figure 4:
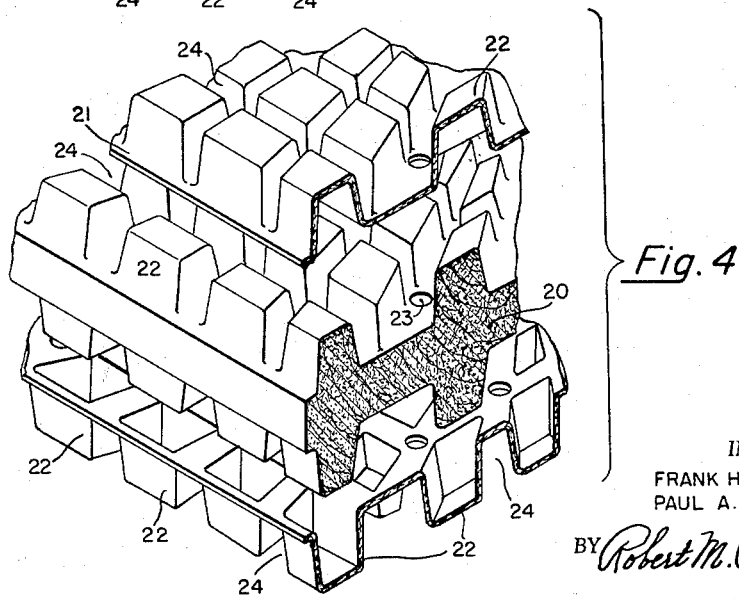
Fig. 4 is an exploded view of the unit of Fig. 3.
Figure 5:
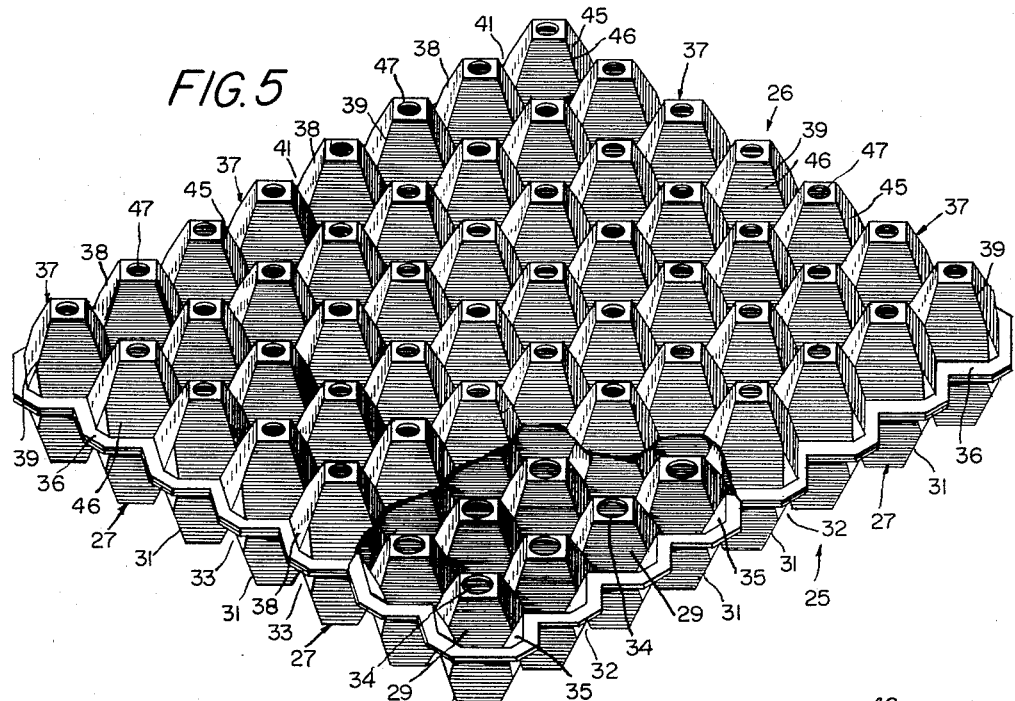
Fig. 5 is a perspective view of a preferred form of the unit of the invention, the same showing the shells prior to filling with the charcoal fuel, and also broken away to show the interior of the lower shell.
Figure 6:
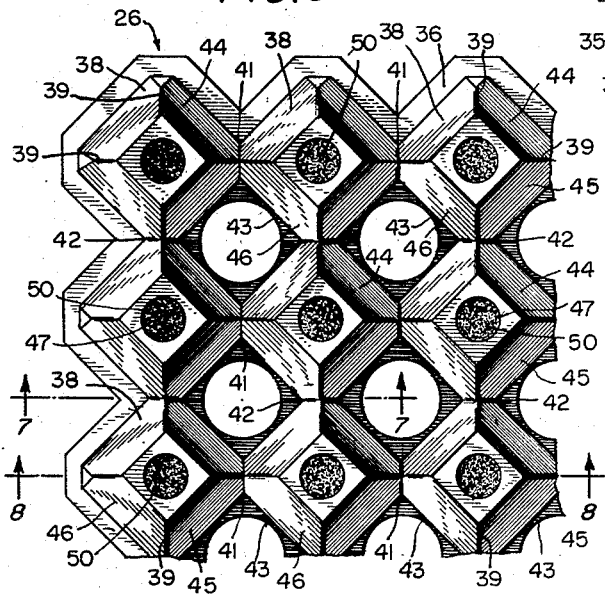
Fig. 6 is a fragmental plane of the unit shown in Fig. 5.
Figure 7:
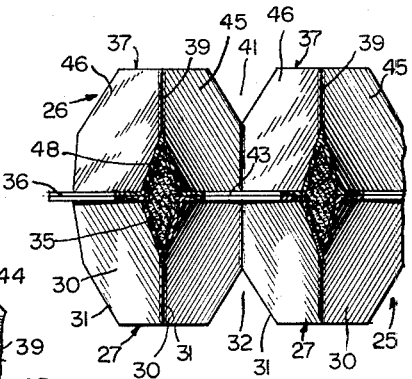
Fig. 7 is a section view on line 7—7 of Fig. 6.
Figure 8:
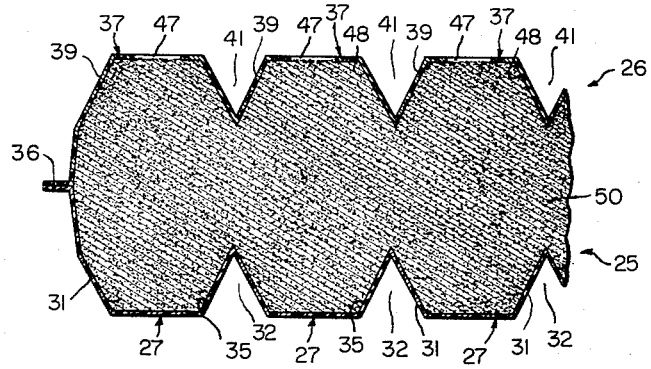
Fig. 8 is a section view on line 8—8 of Fig. 6.
Figure 9:
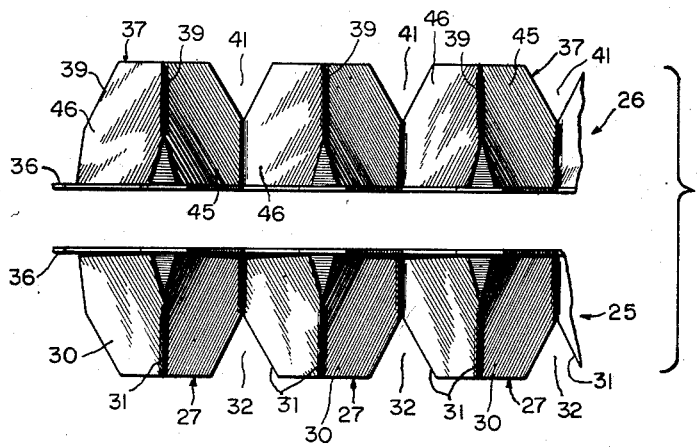
Fig. 9 is a fragmentary exploded side elevation view of the molded skin members into which the charcoal composition is to be extruded when these members are mounted back-to-back.
Figure 10:
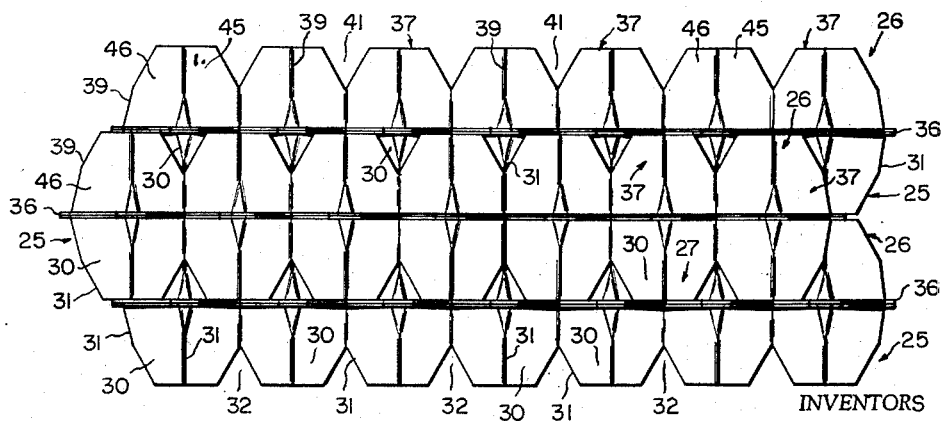
Fig. 10 is a side elevation view of a plurality of the units as nested for convenient packaging and transportation.

While the foregoing relates to one aspect of the invention wherein a mat 10 of charcoal or the like and a single combustible covering 11 is used, it is preferred that the invention comprise a mat 20 molded or firmly compressed like a sandwich between two coverings 21 and 22 of combustible material such as paper mache of molded protuberances (see Figs. 3 and 4). Each of the coverings 21 and 22 is a replica of the other as well as that of covering 11 of Fig. 1. In this form therefore the draft holes 23, corresponding to the holes 16 described, pass entirely through the three superposed layers of the assembly to open at opposite ends into the respective passages 24 formed by the oppositely projecting protuberances. This dual covering assembly is particularly efficient in promoting a uniform ignited bed with relatively long burning properties. It should be noted that the mat of fuel as finally assembled with either the single or dual covering interlocks with complete surface contact within the pockets. Also each side face of the mat is in such intimate contact with its juxtaposed covering face as to provide some very effective bonding between the joined parts. Furthermore in assembled condition the two coverings 21 and 22 overlie the sides of the mat with meeting margins lapping as a continuous joint so thereby to form a protecting housing for the mat which prevents mat breakage or disintegration while handling.

In the preferred form of the invention as shown in Figs. 5 to 10 of the drawings, the unit comprises two shells 25 and 26 formed of wood fibre or other tough relatively thick combustible material, each shell being preformed into a plurality of interconnected rows of cavity-forming protuberances. For example, the thickness of the shells is approximately of the order of 35 to 65 thousandths of an inch. As planar viewed the plurality of protuberances present a lattice-work of lengthwise and transverse rows forming generally symmetrical intersecting cross channels. The two shells are arranged to be assembled in back-to-back relation so that the plurality of protuberances of one shell are oppositely disposed with respect to the protuberances of the other shell.

Referring specifically to the shell 25, which in the assembled unit is, preferably, the bottom section, the protuberances 27 are pressed outwardly from the base sheet of material, each in the form of a truncated inverted pyramid depending from a polygonal base, though it is to be understood that the protuberances may be truncated cones. For either form the desiratum is to provide sharp angles between sides and between contiguous protuberances. The pyramidal form is preferred because the pairs of meeting sides provide sharp edges which serve effectively for quick ignition and fast distribution of flame over the material of the shell 25.

Taking four contiguous inverted protuberances as an example for the description as representative of the overall protuberance relationship, each protuberance forms with its adjacent one diverging plane faces 30, the boundary edges 31 of which meet approximately medially of the length of a protuberance. Thus when viewed from the side the edges 31 form an inverted V cut as one of a channel 32, forming a row of spaced V's. Likewise from the end view the edges 31 form an inverted V as one of a channel 33 forming a row of spaced inverted V's. Since the inverted V's are relatively short, each pocket of each protuberance, at its base, communicates internally with the pocket of an adjacent pocket. Thus where each protuberance is bounded corner wise with four protuberances the pocket of that protuberance is laterally in communication with the respective pockets of these bounding protuberances. Further, the inner contiguous faces of the four protuberances converge as a resulting central upstanding pyramid having a draft hole 34 in its top. While viewed from above the example arrangement of four molded similar parts appears as four closed bottom internal cavities 35 which form and bound a substantially centrally disposed upright pyramid with the draft hole 34 at the top. With a duplication of these four internally communicating pyramids depending throughout the area of the formed sheet, a substantially flat planar body is formed of a thickness corresponding to the vertical length of the pyramid protuberances, said protuberances lying within the confines of a marginal border 36 preferably matching the outer configuration of the protuberances.

The shell 26 is formed as another substantially planar body of protuberances 37 complementally shaped to seat upon the shell 25 and with each protuberance dimensioned to precisely match its component in the lower shell 25. Again taking four protuberances as representative as parts of a whole, each truncated protuberance forms with its adjacent one upwardly converging faces 38, the opposite bounding edges 39 of which meet approximately medially of the length of a protuberance. Since the protuberances of this shell are reversed with respect to the protuberances of the shell 25, a side view shows that these edges 39 form a true V cut, which is one of a channel 41 formed as a row of spaced V's. Likewise from the end view the edges 39 form a true V as one of a channel 42 formed as a row of spaced V's. Since the V's are relatively short each pocket of each protuberance, at its base, communicates internally with the pocket of an adjacent pocket. Thus where each protuberance is bounded edge-wise with four adjacent protuberances, the pocket of that protuberance is laterally in communication with the pockets of the four adjacent protuberances. Also the faces 38 diverge downwardly, in this instance, to form a draft hole 43 which registers with the draft hole 34 when the shells are superposed to thereby form a complete through draft hole. The so formed hole 43 forms an air passage which communicates with the cross channels 41 and 42.

Considering each pyramidal protuberance of the form here described for example, the face 38 with its continuous truncated sides 44, 45 and 46 converge upwardly to terminate in an inlet hole 47 communicating with the internal cavity 48 of the protuberance and serves as a means for introducing the body-forming charcoal and binder composition. With the two shells adhesively fastened together in superposed relation with respective protuberance cavities 35 and 48 form together an internal chamber with the hole 47 as an inlet for the prepared fuel.

In the preferred form of the invention the fuel is charcoal in a powdered form including a binder, such as starch, mixed with water or other fluid to form a pasty mastic suitable for extruding under pressure. The charcoal is a measured amount precisely proportioned to the thickness of the starting combustible outer covering for the purpose of forming a sheet designed to produce the rapidly required heat for cooking while lasting well beyond the time necessary to cook an ordinary meal. The prepared mastic combustible is placed within an extruding gun, the discharge from which is registered with the inlet hole 47 and the material extruded into the combined cavities 35 and 48 of one of the protuberances. In practice an extruding power actuated plate having outlets respectively matching the inlet holes 47 may be used to simultaneously fill all of the combined cavities. The extruded material while filling the mating portions of each complete pocket is also free to flow laterally into adjacent pockets to thereby form a unitary integrated planar sheet of fuel within the confines of the combustible envelope. The success of this pressure applying operation depends upon the structure of the combustible outer skin to withstand the necessary pressure by the extruding medium and retain the predetermined preformed configuration without breaks or undesirable deformities. In this connection it should be noted that the extruding operation is halted just prior to what would be an overflow condition but is primary to establish an exposed level just below the plane of the tops of the protuberances. This relatively small lowering of the level of the exposed set mastic ensures against flaking and scraped off dust during handling, packaging and transporting.

Furthermore during the extruding operation some of the fluid-like combustible filling material finds its way between the back-to-back facing of the shells to give an added sealed joint effect. Also under this extruding pressure there is a desirable interpenetration of the material into the covering skin which materially aides in spreading the flame across the upper face of the flat unit.

As completed the fuel unit is a flat sheet of predetermined thickness providing an interrupted planar surface which when ignited will produce and sustain a flat bed of burning fuel conforming effectively to the cooking grille positioned above it and ensuring a uniform heat being distributed over the food being cooked. The surface is interrupted by the protruding pyramids which, functioning with the depending pyramids of the lower shell, provide air spaces below and above the mid-planar axis of the sheet, thereby giving free access of air to the top and bottom forming in effect a plurality of chimneys for most efficient burning and heat distribution. This aerified arrangement is enhanced by the plurality of vent holes opening into the cross-channels 41 and 42 respectively of V section, the former having converging inverted V sections leading to the vent holes 43, and the latter having V sections diverging from the vent holes 43. All such construction functions to form a maximum surface area to volume ratio which results in the aforesaid rapid ignition and uniform burning. As a further contribution to quick initial starting the fuel sheet as described above is allowed to dry and then preferably has a coating of paraffin wax applied to the fibre skin, such skin becoming a blotting element to easily absorb and hold a sufficient amount of the wax not only as a protection from moisture absorption but also to materially facilitate the initial starting and kindling of the sheet.

While it has heretofore been proposed to provide packages of loose briquets in a paper box, which latter is ignited, the resulting fire is neither uniformly distributed nor able to produce the maximum burning efficiency because of the irregularities of the individual briquets, the scrambled mass, and the wasteful and oversize passageways therebetween.

It will now be apparent that a complete unitary fuel assembly has been devised which can be readily ignited and initially emit a maximum of heat within a few minutes and continue to do so for the time necessary to cook a meal. Also, the assembly has a shape conforming to such requirements and being generally flat will supply heat over a large area and with an even distribution of such heat. Furthermore, the assembly of the invention lends itself to commercial handling against breakage in transit or by the ultimate user.

From the foregoing it will be seen that the novel fuel is compact, easily handled, makes a quick, long lasting fire and is particularly advantageous for use in grilles for outdoor cooking by home users, camping and other vacation parties. While a particular pattern and conformation of the fuel containing protuberances are shown and described, such are merely illustrative and are not limitations of the invention, which broadly comprehends a novel assembly of at least two members, one of which consists of carbonaceous combustible material forming the main bulk of the assembly while the other is a readily combustible envelope in coordinated relation with the carbonaceous member so that the two meeting surfaces interpenetrate to transmit ignition from one to the other by conduction.

While in the foregoing extruding of the carbonaceous filling of the shells has been referred to as illustrative of one method of construction it is to be understood that the method is open to modification because this filling may be preformed and dried as plate with protuberances, as shown in the preferred form after which the fibrous combustible material can be pressed into place as a unitary envelope or even sprayed on for the same purpose.

Having now described our invention, we claim:

1. A preformed substantially flat dustless fuel bed unit for charcoal cooking comprising a rigid and solid mat of carbonaceous briquetted fuel material including a plurality of protuberances arranged in spaced contiguous arrays separated by air channels, said mat having draft openings extending therethrough at the intersections of said channels and in open communication with said channels, a rapidly ignitable and combustible outer covering on said mat and having draft holes in alignment with said draft openings in said mat, said covering being intimately adhered to the entire exterior surface of said mat and forming therewith an integrated composite fuel unit having high resistance to bending and impact loads, said covering providing rapid initial ignition and combustion of the mat material to substantially uniform cooking temperature in a minimum of time.

2. A fuel unit as set forth in claim 1, wherein each protuberance has a truncated configuration, the sides thereof being disposed at an angle to one another and forming with the sides of adjacent protuberances air spreading diverging passages leading respectively from said draft holes.

3. A fuel unit as set forth in claim 1, wherein said protuberances extend outwardly in opposite directions from a central plane through said mat in arrays of oppositely directed protuberances on the outer surfaces thereof.

4. A fuel unit as set forth in claim 1, wherein said covering consists of a fibrous material providing cushioning and shock absorbing characteristics to the unit, and having a thickness sufficient to give strength to the composite unit and to sustain combustion until the material of said mat is fully lighted.

5. A fuel unit as set forth in claim 1, wherein the bases of the protuberances extend outwardly from a solid web of carbonaceous material interconnecting all said protuberances to thereby provide continuity from each complete protuberance to a contiguous one thereof, and forms an integral rigid slab.

6. A fuel unit as set forth in claim 1, wherein an outwardly freely projecting edge on said covering peripherally surrounds said fuel unit and webs of the covering material freely projects into each said draft opening to provide a large amount of initial ignitable covering surface.

References Cited in the file of this patent

UNITED STATES PATENTS

| | | |
|---|---|---|
| D. 101,892 | Seltzer | Nov. 10, 1936 |
| 1,285,087 | Fay | Nov. 19, 1918 |
| 2,438,375 | Rogow | Mar. 23, 1948 |
| 2,637,479 | Cox | May 5, 1953 |

FOREIGN PATENTS

| | | |
|---|---|---|
| 9,599 | Great Britain | May 6, 1896 |
| 401,357 | France | Mar. 29, 1909 |
| 496,007 | Great Britain | Nov. 23, 1938 |
| 877,553 | France | Dec. 10, 1942 |